(12) United States Patent
Krantz et al.

(10) Patent No.: US 7,284,062 B2
(45) Date of Patent: Oct. 16, 2007

(54) INCREASING THE LEVEL OF AUTOMATION WHEN PROVISIONING A COMPUTER SYSTEM TO ACCESS A NETWORK

(75) Inventors: Anton W. Krantz, Kirkland, WA (US); Timothy M. Moore, Bellevue, WA (US); Dalen M. Abraham, Redmond, WA (US); Shai Guday, Redmond, WA (US); Pradeep Bahl, Redmond, WA (US); Bernard D. Aboba, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 852 days.

(21) Appl. No.: 10/313,084

(22) Filed: Dec. 6, 2002

(65) Prior Publication Data

US 2004/0111520 A1 Jun. 10, 2004

(51) Int. Cl.
*G06F 15/16* (2006.01)
(52) U.S. Cl. ...................................... 709/229; 709/249
(58) Field of Classification Search ...................... None
See application file for complete search history.

(56) References Cited

U.S. PATENT DOCUMENTS 7,016,877 B1 * 3/2006 Steele et al. ................... 705/50
7,082,535 B1 * 7/2006 Norman et al. ............. 713/163
2002/0013831 A1 1/2002 Astala et al. ................ 709/220
2002/0035699 A1 3/2002 Crosbie ....................... 713/201
2002/0133715 A1 9/2002 Benini ......................... 713/200
2003/0065919 A1 * 4/2003 Albert et al. ................ 713/168
2004/0019786 A1 * 1/2004 Zorn et al. ................... 713/168
2004/0102182 A1 * 5/2004 Reith et al. .................. 455/410
2004/0139204 A1 * 7/2004 Ergezinger et al. ......... 709/229
2004/0225709 A1 * 11/2004 Kubler et al. ............... 709/200

FOREIGN PATENT DOCUMENTS

WO  WO/99/16266  4/1999

* cited by examiner

*Primary Examiner*—John B. Walsh
(74) *Attorney, Agent, or Firm*—Workman Nydegger

(57) ABSTRACT

A computer system attempts to authenticate with a server to gain authorization to access a first network. It is determined by the server that the computer system is not authorized to access the first network. The computer system is given authorization to access a second network for at least the purpose of downloading files (e.g., signup and configuration files) needed to access the first network. A user-interface for receiving user-entered signup information is automatically presented at the computer system. A first schema-based document including user-entered information is transferred to the server. If the server determines that the user-entered information is appropriate, a second-schema document, which includes an indication of authorization to access the first network (e.g., a user-identifier and password), is received. A third schema-based document is executed at the computer system to compatibly configure the computer system for accessing the first network.

40 Claims, 4 Drawing Sheets

INCREASING THE LEVEL OF AUTOMATION WHEN PROVISIONING A COMPUTER SYSTEM TO ACCESS A NETWORK

BACKGROUND OF THE INVENTION

1. The Field of the Invention

The present invention relates to configuring computer systems to appropriately communicate on a network, and more specifically, to automatically providing a computer system with appropriate information such that the computer system can be provisioned to communicate on a network.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form computer networks over which the computer systems can communicate electronically to share data. As a result, many of the tasks performed at a computer system (e.g., accessing electronic mail and web browsing) include electronic communication with one or more other computer systems via a computer network (e.g., the Internet).

In order to communicate electronically on a computer network a computer system may need to be authorized to access the computer network. For example, before a computer system can communicate electronically on the Internet, a user of the computer system is often required to register with an Internet Service Provider (hereinafter referred to as an "ISP") that can authorize access to the Internet. Registering with an ISP typically includes some form of communication other than electronic communication on a network. For example, a user may be required to initiate telephonic communication with a representative of an ISP in order to establish an account with the ISP.

During this telephonic communication, a user can provide the ISP representative with general information (e.g., name, address, etc.) and a form of payment (e.g., a credit card number). In return, the ISP can provide the user with a username and password that can be used to authenticate the user and authorize access to the Internet. In many cases, the ISP also sends, via a postal or other delivery service, access software (e.g., a dialer, Web browser, etc.) and/or hardware (e.g., a DSL modem or cable modem) that must be installed at a computer system. For the user to connect the ISP and thereby access the Internet, any access software and hardware must be correctly installed at the computer system. As such, a user desiring to access the Internet is frequently required to wait until such software and hardware is received. Then, after access software and/or hardware is received, the user must correctly install the access software and/or hardware at the computer system to enable Internet access.

If correctly installed, a user may be able to connect to the ISP and enter the username and password provided by the ISP. The ISP can authenticate the user based on the username and password and if appropriate (e.g., when the user's payments are up to date) the ISP can authorize the user's computer system to access the Internet. Unfortunately, if a user is not currently registered with an ISP, there is in most cases no way to use electronic communication on the Internet to initiate a registration process. This is because most ISPs are accessed from the Internet and when a user has no way to access the Internet they in turn have no way to access an ISP for registration.

Thus in many cases, users wishing to access the Internet are subjected to contacting an ISP telephonically and waiting for appropriate access software and/or hardware to be delivered. Further, users who attempt to connect to an ISP without appropriate credentials (e.g., user name and password) or without authorization (e.g., payments are not up to date) are typically completely blocked from all network access to both the ISP and the Internet. Thus, even if a user knows an ISP access number to dial into (or an ISP network address to attempt to connect to), a user may still be required to contact the ISP using other communication methods in order to register (or correct account deficiencies) with the ISP.

In some cases, such as, for example, when connecting to an ISP from home, the delay in waiting for access software and hardware may be tolerable. However, in other cases such a delay may be unacceptable. For example, when traveling through an airport or staying at a hotel, a user with a mobile computer system, such as, for example, a laptop, may desire to access the Internet. Partially as a result of this demand for mobile access, many hotels and airports offer Internet access through both wired and wireless services. Gaining authorization to access the Internet through these services typically requires some form of electronic communication with the service to enter user information and payment information.

Typically, these services require that a user plug a cable into a network interface card in the mobile computer system (or use a wireless network interface card to initiate a connection) and then open a Web browser. However, a user must have knowledge that these actions are to be performed before they attempt to register with a service. For example, if a to user does not know that they must open the Web browser, there is essentially no way for the user to register with the service. When the Web browser is opened, the service then redirects any communications from the Web browser through a Web based registration process. A user may be presented with an interface to enter information for registration (e.g., name, room number, credit card number, etc.). If the registration information is appropriate, the user can be authorized to access the Internet using the service.

Unfortunately, many services are proprietary and each service may require different computer system configurations and/or registration information for authorizing access to the Internet. However, a user may have no way to know before attempting to register with a service what system configuration and/or registration information is needed. Thus, even if a user successfully registers with a service at one location (e.g., an airport), the user may be prevented from registering at another location (e.g., a hotel) due to an improperly configured computer system or lack of appropriate registration information.

Further, most hotel and airport services authorize Internet access for only a short period of time (e.g., 24 hours) before an account is expired. After the account expires, the user may need to once again open a Web browser (and perhaps also re-connect a cable) and re-enter all of the registration information that was previously entered. Thus, even if a user was initially aware that they must open a Web browser to register with a service, the user may not know that a Web browser must be opened every day in order to re-register with the service. Often, registration information entered in a prior registration (e.g., on a previous day) must be re-entered even if none of the registration information has changed. If the registration information is somewhat substantial, re-registering after a short period of time may be an annoyance to a user who has entered appropriate registration information in the past.

Additionally, most, if not all, of these services lack mechanisms for changing the software configuration of a computer system. That is, a service typically cannot provide a computer system with machine-readable instructions that can be processed at the computer system to cause the computer system to become compatible with the service. A service may provide HyperText Markup Language ("HTML") instructions as part of Web based interface for receiving registration information. However, HTML instructions typically cannot be processed by a computer system to modify the computer system's configuration. Thus, any software incompatibilities must be worked out by a user that may lack the technical expertise or desire to re-configure software for compatibility with the service.

Therefore what would be advantageous are systems, methods, computer program products, and data structures for increasing the level of automation when provisioning and configuring a computer system to access a network.

BRIEF SUMMARY OF THE INVENTION

The foregoing problems with the prior state of the art are overcome by the principles of the present invention, which are directed towards methods, systems, computer program products, and data structures for increasing the level of automation when provisioning and configuring a computer system to access a network.

A server includes the functionality to authorize clients to access a second network (e.g., the Internet). The server can be located on a first network that is separate from the second network or can be located on the second network. A client sends credentials to the server to attempt to authenticate with the server. Based on the credentials, the server may authorize the client for at least partial access to the second network and/or may deny access to the second network and authorize the client for at least partial to access to the first network. The server can be a Remote Authentication Dial-In User Service ("RADIUS") server that is located on the first network. Clients can be provided partial access to the first or second network at least for the purposes of authenticating with the server and downloading provisioning files used to gain full access to the second network. Thus, computer systems that are not currently able to access resources located on the second network may be able to electronically download provisioning files for gaining access to those resources.

A determination of whether data from the client is to be transferred to the first network or the second network can be implemented using any number of techniques, such as, for example, Virtual Local Area Networks ("VLANs"), Internet Protocol ("IP") filtering, Virtual Private Networks ("VPNs"), or use of IP Security ("IPSec") protocols. In some embodiments, similar techniques can also be used within a single network. In these embodiments, the server (based at least in part on received credentials) may authorize the client for at least partial access to the single network, such as, for example, by authorizing client access to selected computer systems or modules on the single network.

Sending credentials can include sending an Extensible Authentication Protocol ("EAP") Response/Identity message from the client to the server. If the client is attempting to connect to a network via an access point, the EAP Response/Identity message may be encapsulated within some other type of message that can be transferred through the access point. In VLAN embodiments, the access point can insert a Tag Header into the encapsulating message to indicate to a data routing device that the encapsulating message is to be transferred to the first network. The access point may also be configured to block communications from the client that use protocols other than EAP and 802.1X.

If credentials do not authorize full access to the second network (e.g., credentials cannot be authenticated, credentials are guest credentials, or an authenticated user is not authorized), the server can respond by sending a notification, such as, for example, an EAP-Notification or a Type-Length-Value ("TLV") object within Protected EAP ("PEAP"), to the client. The notification can be encrypted and integrity checked in accordance with PEAP. The notification can include a Uniform Resource Identifier ("URI") to a master document that contains information for provisioning the client. The notification can also include conditions (e.g., signup, renewal, etc.) a user must satisfy to become authorized for (full access to resources located on the second network.

The notification may indicate to the access point that communications using the HTTP protocol should be enabled (unblocked) such that the client can download the master document by accessing the included URI (e.g., by executing an HTTP or HTTPS get). In response to the notification, the client can automatically download the master document. The master document can contain URIs to sub-files, including a configuration sub-file and a signup sub-file, which can also be automatically downloaded. When one ISP uses services from another ISP, one master document may also contain URIs to other master documents. Thus, there is little need to contact a service provider using other communication methods in order to request files for gaining access to a network. The master document and any associated sub-files can be defined in accordance with an eXtensible Markup Language ("XML") schema. For example, a configuration sub-file can be defined in accordance with an XML configuration schema.

In some embodiments, the master document and sub-files may be accessed by mechanisms other than a URI provided in a notification, such as, for example, by accessing a master document and/or sub-files from removable computer-readable media (floppy disk, flash card, etc.). This is advantageous in environments that require provisioning information before network connectivity can be configured, such as, for example, remote dial-up. After connectivity is established, the master document and sub-files can be subsequently updated from the network.

A downloaded signup sub-file can be processed at the client to automatically present a user-interface that can receive user-entered information. Thus, a user need not have prior knowledge of how to cause the user-interface to be presented. A user-interface can be presented in a variety of different written languages, such as, for example, English, Japanese, French, or German. Once presented, user-entered information can be received into the user-interface. If a user-interface is presented for purposes of renewing a registration, the amount of user-entered information received at the user-interface may be reduced. For example, previously entered user information can be retrieved from a user database. It may be that a presented user-interface includes only "YES" and "NO" controls for authorizing further credit card payments.

A first schema-based document that includes the user-entered information is submitted to the server (e.g., by executing an HTTP or HTTPS post). This can include submitting an XML document that is defined in accordance with an XML sign-up schema. After submitting the first schema-based document, the client can receive an indication that the server authorized the client to access resources located on the second network. This can include receiving a second schema-based document that includes a user-identifier and password or that includes an indication that a credit card payment has been approved. In VLAN embodiments, when a client is authorized to access resources located on the second network, the access point may insert Tag Headers into client data to indicate to the data routing device that client data is to be transferred to the second network. The access point may also enable communication using other currently blocked protocols, such as, for example, Simple Mail Transfer Protocol ("SMTP") and Dynamic Host Control Protocol ("DHCP").

A third schema-based document is executed to configure the client for compatible operation with the second network. This can include executing a configuration sub-file that was received from the server. A configuration sub-file can be executed to configure connection type, communication protocols, authentication type, encryption type, etc. A configuration sub-file can be executed at virtually any time after it is downloaded. There is no requirement that a configuration sub-file be executed before or after user-entered information is received. Through the execution of a schema-based document, the client can be re-configured with little or no user intervention. This relieves users from having to manually re-configure the client for compatible operation with the second network.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
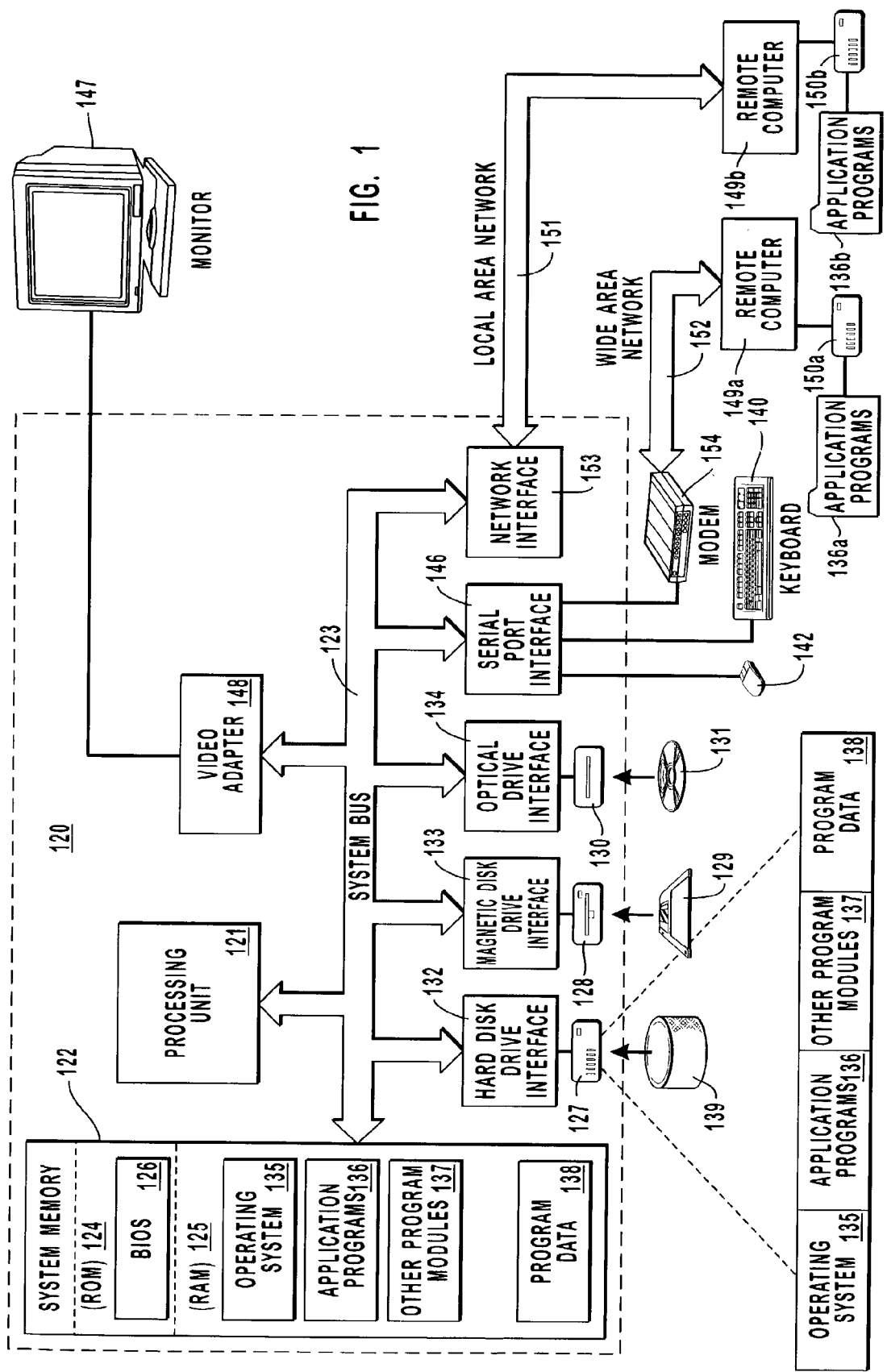
FIG. 1 illustrates a suitable operating environment for the principles of the present invention.

The principles of the present invention provide for increasing the level of automation when provisioning and configuring a computer system to access a network. A client attempts to become authorized to access resources located on a second network (e.g., the Internet). The client sends credentials to an access point that is communicatively coupled to a server (located on a first network or located on the second network) that can authorize access to the second network. The server receives the client credentials and determines if the client credentials authorize access to the second network.

When full access to resources located on the second network is not authorized, the server can authorize limited access to the first network or second network such that the client can download provisioning files for gaining full access resources located on the second network. In some embodiments (e.g., when the server is located on the first network), the server can authorize (at least limited) access to the first network, while restricting access to the second network. In other embodiments (e.g., when the server is located on the second network), the server can authorize limited access to the second network. Restricting and/or limiting access to a network can be implemented using a wide variety of techniques, such as, for example, Virtual Local Area Networks ("VLANs"), Internet Protocol ("IP") filtering, Virtual Private Networks ("VPNs"), or IP Security ("IPSec") protocols.

The server provides the client with a Uniform Resource Identifier ("URI") to a master document that contains information for provisioning the client. The master document can contain further URIs to sub-files or other master documents, including a configuration sub-file and a signup sub-file. After receiving URTs, the client can automatically download any appropriate provisioning files. The master document and any associated sub-files can be defined in accordance with eXstensible Markup Language ("XML") schemas.

A downloaded sign-up sub-file can be processed at the client to automatically present a user-interface that can receive user-entered information. The client can submit a first schema-based document including user-entered information to the server. This can include submitting an XML document defined in accordance with an XML schema. After submitting the first schema-based document, the client can receive a second schema-based document that indicates (e.g., by including a user-identifier and password) the client has been authorized to access resources located on the second network.

A third schema-based document is executed at the client to configure the client for compatible operation with the second network. This can include executing a configuration sub-file that was received from the server. A configuration sub-file can be executed to configure connection type, communication protocols, authentication type, encryption type, etc. A configuration sub-file can be executed at virtually any time after it is downloaded. There is no requirement that a configuration sub-file be executed before or after user-entered information is received.

Embodiments within the scope of the present invention include computer-readable media for carrying or having computer-executable instructions or data structures stored thereon. Such computer-readable media can be any available media that can be accessed by a general-purpose or special-purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general-purpose or special-purpose computer.

When information is transferred or provided over a network or another communications connection (either hardwired, wireless, or a combination of hardwired or wireless) to a computer system, the computer system properly views the connection as a computer-readable medium. Thus, any such connection is properly termed a computer-readable medium. Combinations of the above should also be included within the scope of computer-readable media. Computer-executable instructions comprise, for example, any instructions and data which cause a general-purpose computer system, special-purpose computer system, or special-purpose processing device to perform a certain function or group of functions. The computer-executable instruction may be, for example, binaries, intermediate format instructions such as assembly language, or even source code.

In this description and in the following claims, a "logical communication link" is defined as any communication path that can enable the transport of electronic data between two entities such as computer systems or modules. The actual physical representation of a communication path between two entities is not important and can change over time. A logical communication link can include portions of a system bus, a local area network (e.g., an Ethernet network), a wide area network, the Internet, combinations thereof, or portions of any other path that may facilitate the transport of electronic data. Logical communication links can include hardwired links, wireless links, or a combination of hardwired links and wireless links. Logical communication links can also include software or hardware modules that condition or format portions of electronic data so as to make them accessible to components that implement the principles of the present invention. Such modules include, for example, proxies, routers, firewalls, switches, or gateways. Logical communication links may also include portions of a virtual network, such as, for example, Virtual Private Network ("VPN") or a Virtual Local Area Network ("VLAN").

In this description and in the following claims, a "schema" is defined as an expression of a shared vocabulary between a plurality of computer systems that allows the plurality of computer systems to process documents according the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actual file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. XML elements and attributes can be defined to represent data types that are defined by a schema. In this definition and the following claims, "schema-based" refers to being defined by and/or within a schema.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions represents examples of corresponding acts for implementing the functions described in such steps.

With reference to FIG. 1, an exemplary system for implementing the invention includes a general-purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical communication links to one or more remote computers, such as remote computers 149a and 149b. Remote computers 149a and 149b may each be another personal computer, a client, a server, a router, a switch, a network PC, a peer device or other common network node, and can include many or all of the elements described above relative to the computer 120, although only memory storage devices 150a and 150b and their associated application programs 136a and 136b have been illustrated in FIG. 1. The logical communication links depicted in FIG. 1 include local area network ("LAN") 151 and wide area network ("WAN") 152 that are presented here by way of example and not limitation. Such networking environments are commonplace in office-wide or enterprise-wide computer networks, intranets and the Internet.

When used in a LAN networking environment (e.g. an Ethernet network), the computer 120 is connected to LAN 151 through a network interface or adapter 153, which can be a wired or wireless interface. When used in a WAN networking environment, the computer 120 may include a wired link, such as, for example, modem 154, a wireless link, or other means for establishing communications over WAN 152. The modem 154, which may be internal or external, is connected to the system bus 123 via the serial port interface 146. In a networked environment, program modules depicted relative to the computer 120, or portions thereof, may be stored in at a remote memory storage device. It will be appreciated that the network connections shown are exemplary and other means of establishing communications over wide area network 152 may be used.

While FIG. 1 illustrates an example of a computer system that may implement the principles of the present invention, any computer system may implement the features of the present invention. In the description and in the claims, a "computer system" is defined broadly as any hardware component or components that are capable of using software to perform one or more functions. Examples of computer systems include desktop computers, laptop computers, Personal Digital Assistants ("PDAs"), telephones (both wired and mobile), wireless access points, gateways, firewalls, proxies, routers, switches, hand-held devices, multi-processor systems, microprocessor-based or programmable consumer electronics, network PCs, minicomputers, mainframe computers, or any other system or device that has processing capability.

Those skilled in the art will also appreciate that the invention may be practiced in network computing environments using virtually any computer system configuration. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

In accordance with the present invention, user-interface, provisioning, account maintenance, and authentication modules, as well as associated data, including provisioning data and user data may be stored and accessed from any of the computer-readable media associated with computer 120. For example, portions of such modules and portions of associated program data may be included in operating system 135, application programs 136, program modules 137 and/or program data 138, for storage in system memory 122. When a mass storage device, such as, for example, magnetic hard disk 139, is coupled to computer 120, such modules and associated program data may also be stored in the mass storage device. In a networked environment, program modules depicted relative to computer 120, or portions thereof, can be stored in remote memory storage devices, such as, for example, system memory and/or mass storage devices associated with remote computer system 149a and/or remote computer system 149b. Execution of such modules may be performed in a distributed environment as previously described.

Figure 4:
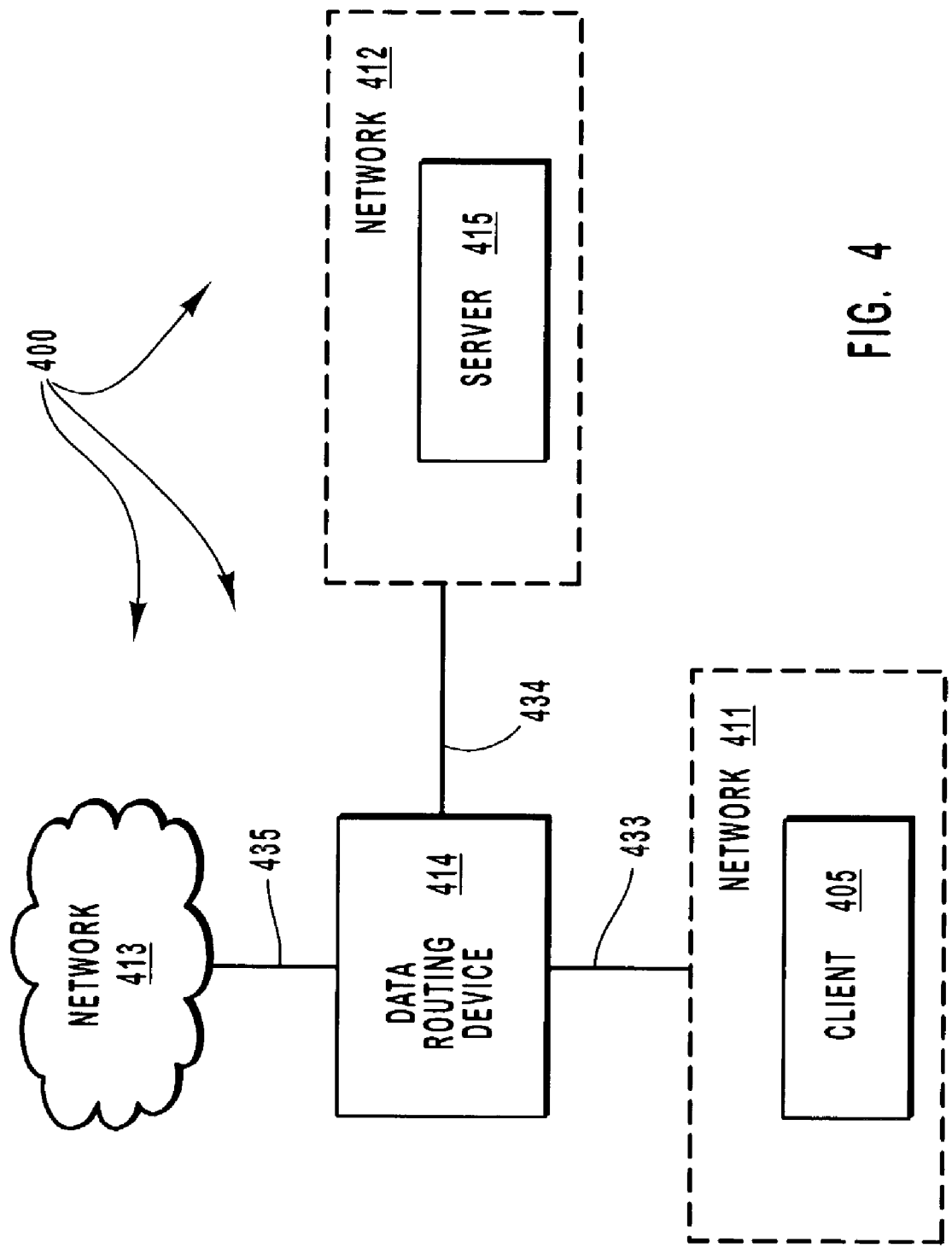
FIG. 4 illustrates generally an example of a network architecture that can provide access to a first network while restricting access to a second network.

FIG. 4 illustrates generally an example of network architecture 400 that can provide access to a first network while restricting access to a second network. Network architecture 400 includes client 405 and server 415. Although not required, client 405 and server 415 can each be structured as described above for computer 120. The terms "client" and "server" are used herein to denote the fact that the client 405 receives a service, such as, for example, access to network 413, from the server 415. While client 405 and server 415 are a client and a server (respectively) in this context, the client 405 may act as a server in another context, and server 415 may act as a client in another context.

As depicted in network architecture 400 data routing device 414 is connected to network 411, network 412, and network 413 by corresponding logical communication links 433, 434, and 435 respectively. Data routing device 414 logically represents a computer system that can determine where to transfer data received from network 411, such as, for example, data received from client 405. That is, when data routing device 414 receives data from network 411, data routing device 414 can determine if the data is to be transferred to network 412 or network 413. As such, data routing device 414 can be configured to allow access to one network (e.g., network 412) while at the same time restricting access to another network (e.g., network 413). Data routing device 414 can make this determination using a variety of different techniques.

In some embodiments, access to resources located on network 413 can be restricted by the use of Virtual Local Area Networks ("VLANs"). In these embodiments, networks 411, 412 and 413 may each be a portion of a different VLAN. VLAN aware devices in network architecture 400 can "Tag" data frames to indicate to data routing device 414 where the data frames are to be routed. For example, when client 405 is not authorized to access resources located network 413, components in network 411 or logical communication link 433 can Tag data frames from client 405 indicating that the data frames are to be routed to server 415 (or other resources located on network 412). When client 405 is authorized to access network 413, components in network 411 or logical communication link 433 can Tag data frames from client 405 indicating that the data frames are to be routed to resources on network 413 (e.g., to the Internet) or to resources on network 412 (e.g., server 412) as appropriate.

In other embodiments, access to resources located on network 413 can be restricted by the use of Internet Protocol ("IP") filtering. Data routing device 414, components in network 411, or components in logical communication link 433 can filter Internet Protocol ("IP") address to limit client 405's access to resources with particular IP addresses. When client 405 is not authorized to access resources located on network 413, IP addresses can be filtered such that client 405 is exposed to IP addresses of resources located on network 412 but is not exposed to IP addresses of resources located on network 413. When client 405 is authorized to access network 413, IP addresses can be filtered such that client 405 is exposed to IP addresses of resources located on both networks 412 and 413. Alternately, when client 405 is authorized to access network 413 IP filtering may cease altogether.

In yet other embodiments, access to resources on network 413 can be restricted by use of a Virtual Private Network ("VPN"). When client 405 is not authorized to access resources located on network 413, a VPN can be configured such that client 405 is exposed to resources located on network 412, but is not exposed to resources located on network 413. When client 405 is authorized to access resources located on network 413, a VPN can be configured such that client 405 is exposed to resources located on both networks 412 and 413. Alternately, when client 405 is authorized to access resources located on network 413 use of a VPN may cease all together.

It should be understood that VLAN, IP filtering, and VPN techniques are merely examples of some of the techniques that can be used to differentiate between networks so as to allow access to one network while restricting access to another network. It should be understood that access to a single network can be limited using VLANs, IP filtering, or VPNs. For example, a server located on network 413 can provide client 405 with limited access to resources located on network 413. It would be apparent to one skilled in the art, after having reviewed this description, that other techniques, in addition VLAN, IP filtering, and VPN techniques, can be used to allow access to one network, while restricting access to another network.

It should be further understood that techniques used to restrict access to a network may also be used to provide limited access to a network. In some embodiments, a server on a network can provide a client with limited access to the network. For example, a server located on network 413 may implement IP filtering to provide client 405 with limited access to network 413. Included in the limited access can be access to computer systems or modules that store provisioning files needed for gaining full access to network 413. Client 405 can be authorized to download provisioning files from these computer systems or modules, while being denied access to other resources located on network 413.

Figure 2:
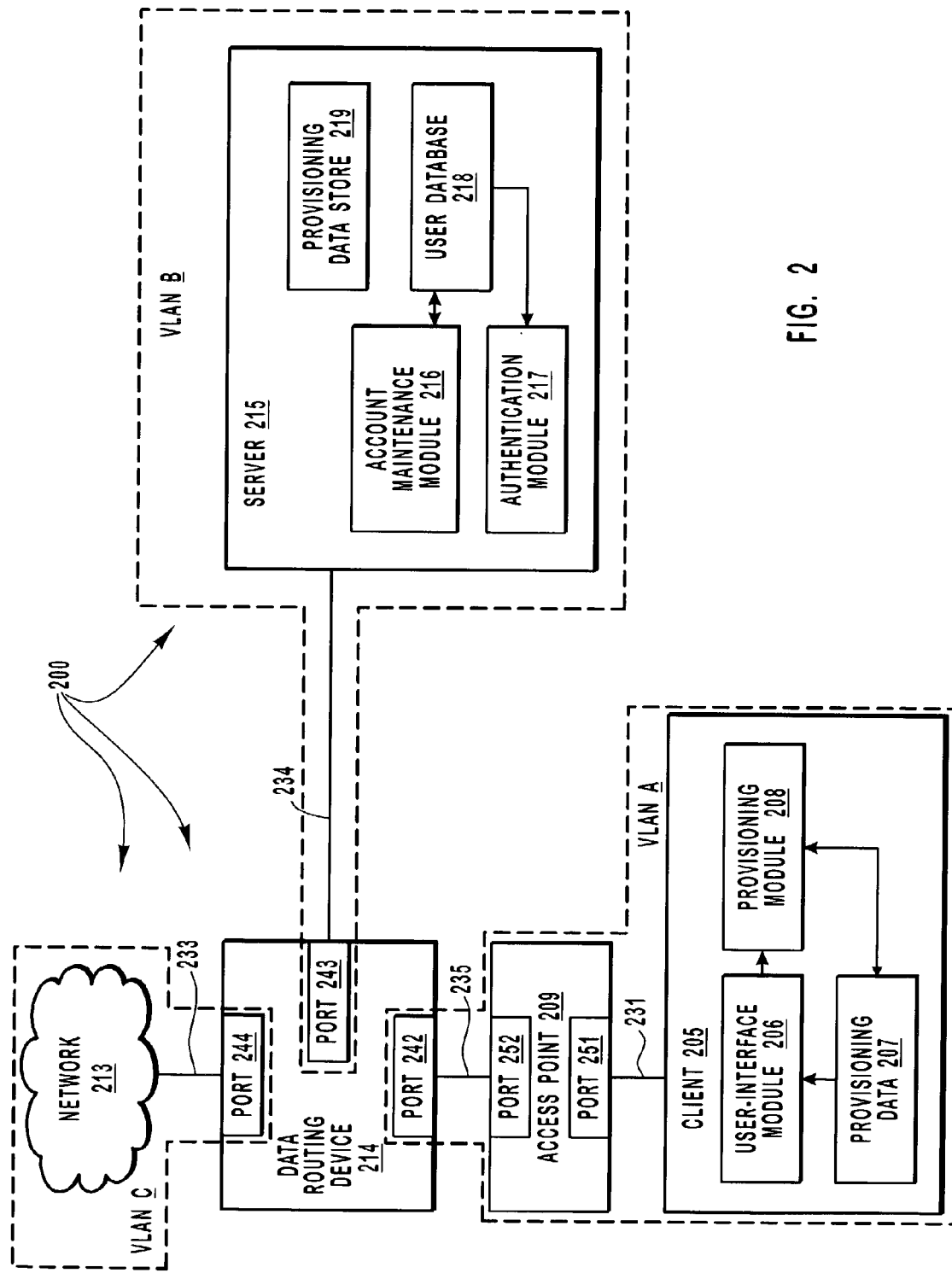
FIG. 2 illustrates an example of a network architecture that can facilitate increasing the level of automation when provisioning a client.

An example embodiment of the present invention using VLAN techniques will now be described. FIG. 2 illustrates an example of network architecture 200 that can facilitate increasing the level of automation when provisioning a client. Network architecture 200 includes client 205 and server 215, which can each be structured as described above for computer 120

In some embodiments, server 215 logically represents a Remote Authentication Dial-In User Service ("RADIUS") server. That is, although visually depicted by a single system, server 215 may include a separate Network Access Server ("NAS"), a separate authentication server, and a separate shared accounting server. The servers logically represented by server 215 can be configured to communicate using the RADIUS protocol and, more specifically, may support the RADIUS attributes EAP-Message and Message-Authenticator. Server 215 may have modules from a variety of different services loaded into system memory, such as, for example, Internet Information Services ("IIS") modules, Internet Authentication Services ("IAS") modules, Dynamic Host Control Protocol ("DHCP") modules, and Active Directory ("AD") modules, so as to facilitate implementation of the principles of the present invention.

Network architecture 200 also includes data routing device 214. Data routing device 214 logically represents a special-purpose computer system, such as, for example, a router and/or a switch, that can determine how to transfer data between the ports included in data routing device 214. That is, when a portion of data, such as, for example, a data frame, is transferred in at a first port (e.g., port 242) data routing device 214 can determine, based on configuration rules, that the frame is to be transferred out at a second port (e.g., port 243). For example, data routing device 214 can determine that a data frame received from access point 209 is to be sent to server 215. It may also be that a data frame is transferred in and out of data routing device 214 at the same port.

As depicted in network architecture 200 data routing device 214 is connected to network 213, server 215, and access point 209 by corresponding logical communication links 233, 234, and 235 respectively. Network 213 can be virtually any type of network, such as, for example, a corporate or enterprise-wide network or the Internet. Data routing device 214 can be a device capable of grouping computer systems together in a single broadcast domain based on criteria other than physical location (e.g., a physical location on a particular side of a router). Thus, data routing device 214 can be configured to separate computer systems into different VLANs. As depicted in FIG. 2, data routing device 214 has been configured to separate network architecture 200 into VLANs A, B, and C. Data routing device 214 can be configured to transfer both tagged data frames and untagged data frames between the VLANs depicted in FIG. 2.

A tagged data frame is a data frame that includes an indication, such as, for example, a Tag Header, that identifies a VLAN and/or frame classification associated with the tagged data frame. A Tag Header can be inserted into a data frame by a VLAN aware device to indicate to data routing device 214 a VLAN ID of the VLAN from which a tagged data frame was received. For example, access point 209 can insert a Tag Header into data from client 205 to indicate to data routing device 214 that the data was received from VLAN A. A Tag Header can also include other control information that can be used by data routing device 214 to classify a corresponding data frame. An untagged data frame is a frame that does not include a Tag Header. A port VLAN ID ("PVID") may be used to indicate a VLAN from which an untagged data frame was received. For example, untagged data frames received at port 243 may be classified as being received from VLAN B.

Any of the ports included in data routing device 214 (e.g., ports 242, 243, and 244) can be configured to transfer tagged data frames but drop untagged data frames. On the other hand, any of the ports of data routing device 214 can also be configured to transfer untagged data frames but drop tagged data frames. It may also be that any of the ports of routing device 214 are configured to transfer both tagged and untagged data frames (a hybrid port configuration).

Network architecture also includes access point 209. Access point 209 can be a wired or wireless access point that facilitates communication between client 205 and data routing device 214. As depicted in network architecture 200, access point 209 is connected to client 205 by corresponding logical communication link 231. Access point 209 may be connected to other clients (not shown) by other corresponding logical communication links (also not shown). Access point 209 includes ports 251 and 252. Data can be transferred between access port 209 and client 205 through port 251. Likewise, data can be transferred between access point 209 and data routing device 214 through port 252. Access point 209 can include other ports (not shown) for communicating with other computer systems, such as, for example, other clients and/or data routing devices.

In some embodiments, access point 209 is a wireless access point that enables access to wired computer systems on VLAN B (e.g., server 215) and VLAN C (e.g., computer systems included in network 213). Access point 209 can be configured as a VLAN aware device and can insert Tag Headers into data frames received from client 205 (or any other computer system on VLAN A) that are to be transferred to VLAN B and/or VLAN C. Access point 209 can be configured to communicate using the RADIUS protocol and, more specifically, may support RADIUS access-accept messages containing a VLAN tag for client 205 (or any other client).

In some embodiments, client 205 can potentially connect to one or more other access points (not shown) in addition to access point 209. It may be that access point 209 and these one or more other access points are all access points for the same service provider. On the other hand, the one or more access points may be access points for one or more other service providers, which are different from the service provider for which access point 209 provides access. Client 205 may be presented with a list of available service providers. A user-selection can be received to initiate a connection to a service provider included in the list.

Client 205 may detect available wireless networks, such as, for example, by receiving IEEE 802.11 beacon frames and/or by sending IEEE 802.11 probe request frames and receiving IEEE 802.11 probe response frames. Beacon frames can include a Service Set Identifier ("SSID"), which is essentially a network identifier used to differentiate one wireless network from another. Through the use of beacon and probe frames client 205 can also detect other configuration settings of an access point, such as, for example, data transfer rates, supported types of authentication (e.g., open or shared authentication), supported types of encryption (e.g., Wire Equivalent Protection ("WEP") or Temporal Key Integrity Protocol ("TKIP")), etc.

It should be understood that the listed configuration settings are merely examples of some of the possible configuration settings and that a large number of other configuration settings, in addition to these example configuration settings, can be determined. For example, when establishing a connection between computer systems, a Link Control Protocol ("LCP") can be used to negotiate connection settings, such as, for example, packet size, a protocol to use for authentication, a protocol to use for link quality monitoring, compression, etc. Numeric Values can be included within an options field of LCP packets (e.g., Configure-Request, Configure-Ack, Configure-Nak and Configure-Reject packets) to negotiate these connection settings. Numeric values may be included in a type field (e.g., the numeric value 3 for authentication-protocol negotiation) within the options field of an LCP packet to indicate the type of configuration option being negotiated. Numeric values may be included in a data field (e.g., the hexadecimal value C227 to indicate EAP) within the options field of an LCP packet to provide corresponding data for the type of negotiation indicated in the type field. When the configuration of EAP is indicated, further numeric values (e.g., the numeric value 13 to indicate EAP-TLS or the numeric value 25 to indicate PEAP) can be included in a LCP packet to indicate the specific EAP type of authentication that is desired.

It may be that a particular EAP type is deterministically selected (e.g., by an administrator of server 215 and/or a user of client 205) when both a client and a server support the particular EAP type. Thus, there is a reduced need for negotiation using LCP packets. After an EAP type is selected (whether it be through negotiation or deterministically), computer systems can attempt to authenticate with one another through the transfer of EAP messages (e.g., start messages, response messages, request messages, accept messages, reject messages, etc.) in accordance with the selected EAP type. For example, when EAP-TLS is selected, client 205 may communicate with server 215 through a series of EAP messages in accordance with EAP-TLS so as to be authenticated and possibly authorized to access resources located on VLAN C.

In some embodiments, EAP messages are encapsulated within other protocols. Thus, although a computer system may not natively support a particular EAP type, the computer system may be able to transfer an encapsulated EAP message. One protocol used for encapsulation is the 802.1X protocol, which may be referred to as EAP encapsulation over LANs ("EAPOL"). Access point 209 and data routing device 214 can be configured to support EAPOL. Thus, access point 209 and data routing device 214 can transfer EAP messages of particular EAP types even if access point 209 and data routing device 214 do not natively support the particular EAP types. Another protocol used for encapsulation is EAP-RADIUS, which encapsulates EAP messages within RADIUS messages. EAP-RADIUS can be used to transfer EAP messages through a computer system that may understand the RADIUS protocol but does not natively understand EAP.

Figure 3:
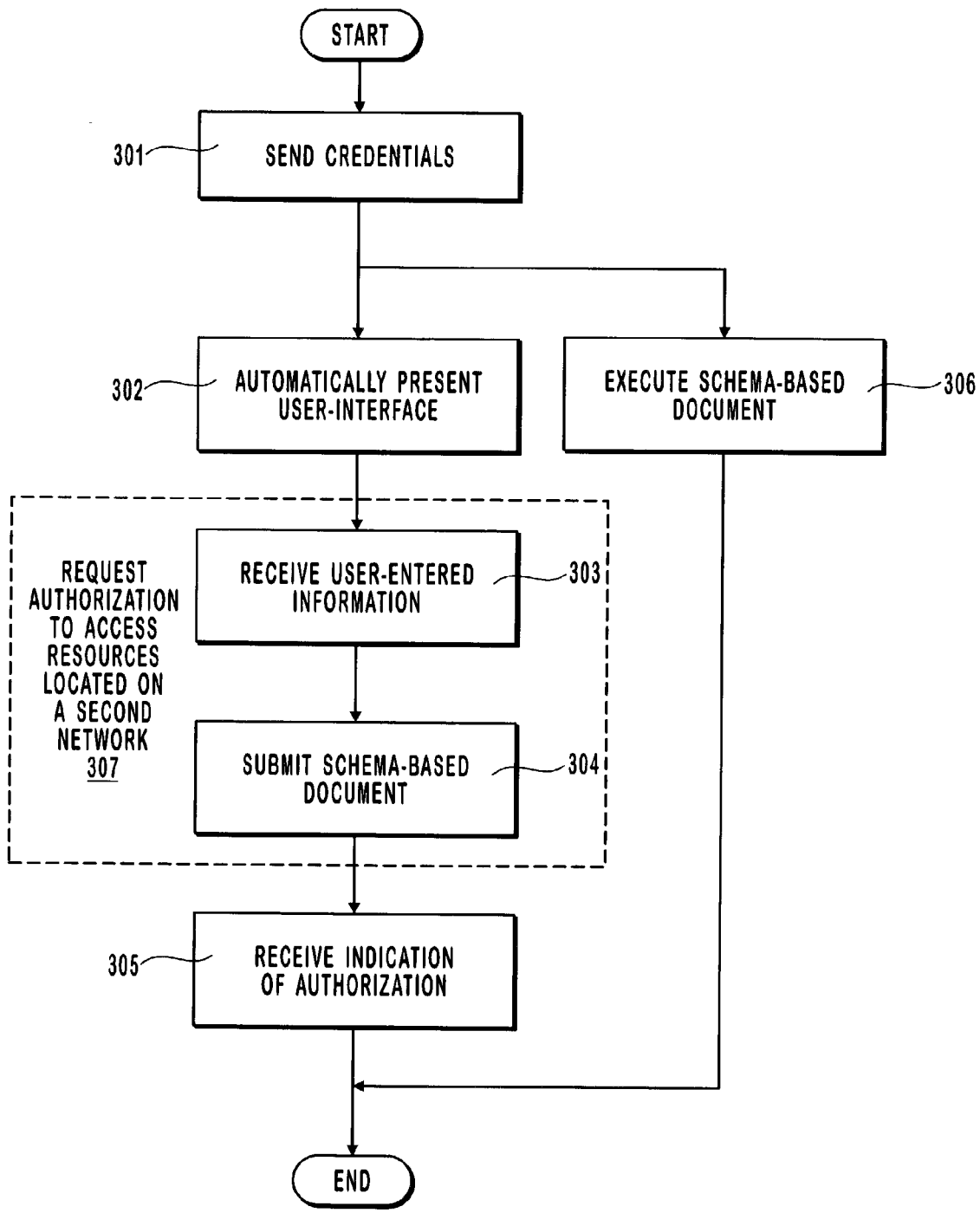
FIG. 3 is a flow diagram illustrating an example of a method for provisioning a computer system.

FIG. 3 is a flow diagram illustrating a method 300 for provisioning a computer system. The method 300 will be described with respect to components depicted in network architecture 200.

The method 300 includes act of sending credentials (act 301). This can include a client sending credentials to a server to attempt to authenticate with a server. For example, client 205 can send credentials to server 215 to attempt to authenticate with server 215. When Client 205 connects to access point 209, access point 209 can detect that the connection is active and can send an EAP-Request/Identity message to client 205. Alternately, client 205 may send an EAP-Start message to access potion 209, which triggers the EAP-Request/Identity message. Client 205 can respond to the EAP-Request/Identity message with an EAP-Response/Identity message that can include a User-Identifier. If a user of client 205 has an account with server 215 this User-Identifier may be a User-Identifier that was assigned to the user by server 215. If server 215 has not assigned a User-Identifier to a user of client 205, client 205 may send a guest User-Identifier.

Access point 209 can enable the transfer of EAPOL packets for port 251. That is, EAPOL packets received at port 251 can be transferred out of access point 209 at port 252. However, access point 209 may block other types of protocols, such as, for example, HyperText Transfer Protocol ("HTTP"), DHCP, and Simple Mail Transfer Protocol ("SMTP"), from being transferred until client 205 is authenticated (and authorized). Access point 209 can insert a Tag Header into an EAPOL packet (e.g., the EAP-Response/ Identify message) indicating that the EAPOL packet is to be transferred to VLAN B.

Data routing device 214 can process the inserted Tag Header and transfer the EAPOL packet onto VLAN B. Server 215 can receive the EAPOL packet, which is transferred to authentication module 217 for authentication. Alternately, access point 209 and/or data routing device 214 may strip the 802.1X encapsulation and instead encapsulate the EAP-Response/Identity message within an EAP-RA-DIUS message that is transferred onto VLAN B. Thus, if logical communication link 234 includes other RADIUS servers, the EAP-Response/Identity message can be transferred through these other servers to server 215.

Depending on the particular EAP type, server 215 can respond to the EAP-Response/Identity message in a variety of ways. Server 215 may request that client 205 provide a password that is associated with a user-identifier. A user of client 205 can respond by providing a password to server 215. It may also be that client 205 and server 215 exchange EAP-messages to pass certificates, keys, and supported cipher suites. Depending on the EAP type, other credential information may also be exchanged between client 205 and server 215.

Returning to FIG. 3, the method 300 includes an act of automatically presenting a user-interface (act 302). This can include automatically presenting a user-interface that can receive user-entered information so that a user of the computer system is not required to have prior knowledge of how to cause the user-interface to be presented. For example, user-interface module 206 can automatically present a user-interface at client 205.

When credentials are sent to server 215, authentication module 217 can receive the credentials (e.g., user-identifier and password) and compare the credentials to entries in user database 218. If credential information matches an entry in user database 218, the identity of a user is authenticated (i.e., server 215 believes that the user represented by the user-identifier is the user who entered the credential information). If an authenticated user of client 205 is authorized to access resources located on VLAN C (e.g., the user is up to date on payments for their account), client 205 can then be authorized to access resources located on VLAN C.

On the other hand, if client 205 is denied access to resources located on VLAN C, server 215 can authorize client 205 for limited access to resources located on VLAN B. Thus, if client 205 is not currently able to access resources located oil VLAN C (e.g., Internet resources), client 205 may be able to electronically download provisioning files (from VLAN B) to become authorized to access resources located on VLAN C. Client 205 may be denied access to resources located on VLAN C when a user cannot be authenticated, a user has sent guest credentials, or an authenticated user is not authorized to access resources located on VLAN C (e.g., when payments are not up to date).

When client 205 is denied access to resources located on VLAN C, server 215 can send an EAP-Notification, which is encrypted and integrity checked in accordance with PEAP, to client 205. The EAP-notification can include a Uniform Resource Identifier ("URI") to a master document that contains information for provisioning computer systems to access resources located on VLAN C. A URI for a master document can be an HTTP Uniform Resource Locator ("URL"), such as, for example, https://www.provider12.com/provisioning/master.xml or http://www.provider9.com/provisioning/master.xml. The EAP-notification can also include conditions a user must satisfy to become authorized to access resources located on VLAN C (e.g., signup, renewal, etc.). If client 205 is to perform downloads by accessing a provided URI, access point 209 can enable the transfer of HTTP packets for port 251. Server 215 may send commands to access point 209 to cause access point 209 to enable the transfer of HTTP packets.

Alternately, server 215 can send an EAP Type-Length-Value ("TLV") objects within PEAP to client 205. The TLV object can include a Uniform Resource Identifier ("URI") to a master document that contains information for provisioning computer systems to access resources located on VLAN C. In some embodiments, the master document (and sub-files) may be accessed by mechanisms other than a URI, such as, for example, by accessing a master document and/or sub-files from removable computer-readable media (floppy disk, flash card, etc.). This is advantageous in environments that require provisioning information before network connectivity can be configured, such as, for example, remote dial-up. After connectivity is established, the master document (and sub-files) can be subsequently updated from the network.

The master document can be an XML file defined in accordance with an XML master document schema that is accessible to the computer systems depicted in network architecture 200. Different master documents can be created for different types of connections, such as, for example, wireless, Digital Subscriber Line ("DSL"), Remote Access Server ("RAS"), LAN, Internet Service Provider ("ISP") referral, Wireless ISP ("WISP"), etc. Thus, the principles of the present invention can be implemented to provision a computer system for network access using virtually any type of connection, including the listed types of connections. A master document can contain URLs for sub-files, such as, for example, help files, configuration files, signup files, and location files. A master document can also contain URLs for other master documents, such as, for example, when a first ISP uses the services of a second ISP.

A master document can also contain a time-to-live ("TTL") value (e.g., five minutes, twenty-four hours, etc.) indicating when a check for an updated master document is to be performed. When a check indicates that an updated master document is available, the updated master document can be downloaded (e.g., to client 205). A master document can include version numbers for each sub-file. When a master document is updated, the version numbers of the sub-files can be checked and when newer versions of sub-files are available these newer versions can be downloaded (e.g., to client 205).

It should be understood that the present invention is not limited to any particular types of schema. However, one type of schema that may be used to implement the principles of the present invention is an XML schema. An XML schema can define elements and corresponding data types that are used in an XML document. The following is an example XML master document schema defining elements and corresponding data types can that can be used in an XML master document:

```
1.   <?xml version="1.0" ?>
2.   <xsd:schema xmlns:xsd=<http://www.w3.org/2001/XMLSchema>
3.      targetNamespace=<http://www.provision.org>
4.      xmlns="http://www.provision.org"
        elementFormDefault="qualified">
5.      <xsd:complexType name="Master">
6.          <xsd:sequence>
```

-continued

```
7.          <xsd:element name="TTL"
                type="xsd:positiveInteger" />
8.          <xsd:element name="Name"
                type="xsd:string" />
9.          <xsd:element name="FriendlyName"
                type="xsd:string" />
10.         <xsd:element name="UpdateFrom"
                type="anyHttps" />
11.         <xsd:element name="Subfile"
                maxOccurs="unbounded">
12.             <xsd:complexType>
13.                 <xsd:sequence>
14.                     <xsd:element name="Schema"
                            type="xsd:string" />
15.                     <xsd:element name="URL"
                            type="anyHttps" />
16.                     <xsd:element name="Version"
                            type="xsd:positiveInteger" />
17.                 </xsd:sequence>
18.                 <xsd:attribute name="Fragment"
                        use="xsd:optional"
                        type="xsd:string"/>
19.             </xsd:complexType>
20.         </xsd:element>
21.     </xsd:sequence>
22. </xsd:complexType>
23. <xsd:simpleType name="anyHttps">
24.     <xsd:restriction base="xsd:string">
25.         <xsd:pattern value="https://*" />
26.     </xsd:restriction>
27. </xsd:simpleType>
28. </xsd:schema>
```

The example XML master document schema defines a "Master" complexType (lines 5-22) that can be used to create a master document for provisioning a computer system. The "Master" complexType further defines a "TTL" element (line 7) that represents a Time-To-Live. A TTL element can be used in a master document to indicate when the master document should be updated. The "Master" complexType also further defines an "UpdateFrom" element (line 10). When the value of a TTL element in an XML master document indicates that the XML master document is to be updated, a URL associated with an UpdateFrom element can be accessed to download an updated version of the XML master document. The "Master" complexType also further defines a "Subfile" element (lines 11-20) that can be used in a master document to define access to a sub-file. The "maxOccurs" attribute of the Subfile element indicates the number of sub-files that can be included in a master document. The value "unbounded" represents that there is no limit on the number of sub-files that can be included in a master document.

Defined within the Subfile element is a "Schema" element (line 14), a URL element (line 15), and a version element (line 16). A Schema element can be included in a master document to represent a name of a schema associated with a sub-file. A Version element can be included in a master document to indicate the version of a sub-file. A URL element can be included in a master document to represent a location where a schema associated with a sub-file can be downloaded. In the example XML master document schema, a URL element is defined as being a text string that begins with the text prefix "https://" (lines 23-27). However, virtually any text prefix, such as, for example, "http://", "ftp://", "telnet://", etc., can be used when implementing the principles of the present invention. A Subfile element can also define an optional "Fragment" attribute that can be included in a master document to represent a particular sub-file (line 18). For example, the Fragment attribute of "#signup" can be used to represent a signup sub-file. A Fragment attribute can be combined with a URL element within an XML master document to provide an absolute location of a sub-file, such as, for example, "https://www-.provisiong.com/master.xml#signup".

Master documents and sub-files may be stored in provisioning data store 219. Client 205 can access a provided URL (or URI) to download a master document and any appropriate sub-files. Master documents and sub-files can be downloaded using an HTTP or HTTPS get. This can include using an HTTP or HTTPS get to download files from a computer system located on VLAN B, such as, for example, a Hot Spot Provider ("HSP"), an ISP Web Server, or provisioning data store 219. Downloaded master documents and sub-files can be stored in provisioning data 207.

A help sub-file can be an XML document defined in accordance with an XML help schema that is accessible to the computer systems depicted in network architecture 200. A help file can contain URLs linking to HyperText Markup Language ("HTML") files that are supplied by server 215 to help a user provision client 205. A help file may also include information about a service provider so a user can learn about the service provider before signing up.

A location sub-file can be an XML document defined in accordance with an XML location schema that is accessible to the computer systems depicted in network architecture 200. A location sub-file can contain a list of HSPs and corresponding postal addresses, hotels and airports where the HSPs are located. Thus, a user going to a particular location may be able to download provisioning files for accessing a network (e.g., the Internet) from a particular location before arriving at the particular location.

It should be understood that the present invention is not limited to connecting to a network in any particular location. The following is an example XML location schema defining elements and corresponding data types that can be used in a location sub-file for indicating a physical location where network access is available:

```
1.  <?xml version="1.0" encoding="utf-8" ?>
2.  <xs:schema targetNamespace=
        <http://tempuri.org/XMLSchema.xsd>
3.      elementFormDefault="qualified"
4.      xmlns=<http://tempuri.org/XML Schema.xsd>
5.      xmlns:mstns=<http://tempuri.org/XMLSchema.xsd>
6.      xmlns:xs="http://www.w3.org/2001/XMLSchema">
7.          <xs:complexType name="Location">
8.              <xs:sequence>
9.                  <xs:element name="Street" type="xs:string" />
10.                 <xs:element name="City" type="xs:string" />
11.                 <xs:element name="State" type="xs:string" />
12.                 <xs:element name="Country" type="xs:string" />
13.                 <xs:element name="ZipCode" type="xs:string" />
14.                 <xs:element name="AreaCode" type="xs:string" />
15.                 <xs:element name="PhoneNumber"
                        type="xs:string" />
16.                 <xs:element name="SupportNumber"
                        type="xs:string" />
17.                 <xs:element name="Provider" type="xs:string" />
18.                 <xs:element name="Category">
19.                     <xs:complexType>
20.                         <xs:choice>
21.                             <xs:element name="Hotel"
                                    type="xs:string" />
22.
23.                             <xs:element name="Bar"
                                    type="xs:string" />
24.
25.                             <xs:element name="Airport"
                                    type="xs:string" />
26.
27.                         </xs:choice>
28                      </xs:complexType>
```

-continued

```
29.            </xs:element>
30.          </xs:sequence>
31        </xs:complexType>
32    </xs:schema>
```

The example XML location schema defines a "Location" complexType (lines 7-31) that can be used to provide physical location information for network access. One, some, or all of the elements defined at lines 9-17 can be included in a location sub-file to indicate different types of location information, such as, for example, street, city, state, country, zip code, area code, phone number, support number, and provider name. The Location complexType further defines a "Category" element (lines 18-29) that in turn further defines categories of locations, such as, for example, hotel, airport, and bar, where access to a network can be physically located.

A configuration sub-file can be an XML document defined in accordance with an XML configuration schema that is accessible to the computer systems depicted in network architecture 200. A configuration sub-file can contain configuration profiles for networks that are accessible to client 205. When client 205 is attempting to access a wireless network, a configuration sub-file can contain profiles corresponding to SSIDs that are accessible to client 205. Configuration sub-files can include information for configuring authentication, encryption, supported protocols, etc. Received configuration sub-files can be stored in provisioning data 207 and processed by provisioning module 208 to configure client 205 for operation on a particular network.

It should be understood that the present invention is not limited to connecting to a network using any particular interface. However, one type of interface that can be used to connect to a network is a wireless interface (e.g., network interface 153 can be a wireless network interface). The following is an example XML configuration schema defining elements and corresponding data types that can be used in a configuration sub-file for connecting to a network through a wireless interface (e.g., a wireless access point):

```
1.    <?xml version="1.0" encoding="utf-8" ?>
2.    <xs:schema targetNamespace=
      <http://tempuri.org/XMLSchema.xsd>
3.    elementFormDefault="qualified"
4     xmlns=<http://tempuri.org/XMLSchema.xsd>
5.    xmlns:mstns=<http://tempuri.org/XMLSchema.xsd>
6.    xmlns:xs="http://www.w3.org/2001/XMLSchema">
7.        <xs:complexType name="SSIDs">
8.            <xs:sequence>
9.                <xs:element name="ssid" type="xs:string" />
10.               <xs:element name="Priority"
                  type="xs:positiveInteger" />
11.               <xs:element name="Connection">
12.                   <xs:complexType>
13.                       <xs:choice>
14.                           <xs:element name="IBSS"
                              type="xs:string" />
15.                           <xs:element name="ESS"
                              type="xs:string" />
16.                       </xs:choice>
17.                   </xs:complexType>
18.               </xs:element>
19.               <xs:element name="Authentication">
20.                   <xs:complexType>
21.                       <xs:choice>
22.                           <xs:element name="Open"
                              type="xs:string" />
```

-continued

```
23.                           <xs:element name="Shared"
                              type="xs:string" />
24.                           <xs:element name="WPA"
                              type="xs:string" />
25.                           <xs:element name="WPAPSK"
                              type="xs:string" />
26.                       </xs:choice>
27.                   </xs:complexType>
28.               </xs:element>
29.               <xs:element name="Encryption">
30.                   <xs:complexType>
31.                       <xs:choice>
32.                           <xs:element name="None"
                              type="xs:string" />
33.                           <xs:element name="WEP"
                              type="xs:string" />
34.                           <xs:element name="TKIP"
                              type="xs:string" />
35.                           <xs:element name="WRAP"
                              type="xs:string" />
36.                           <xs:element name="CCMP"
                              type="xs:string" />
37.                       </xs:choice>
38.                   </xs:complexType>
39.               </xs:element>
40.               <xs:element name="KeyIndex"
                  type="xs:positiveInteger" />
41.               <xs:element name="802.1XAuth">
42.                   <xs:complexType>
43.                       <xs:choice>
44.                           <xs:element name="None"
                              type="xs:string" />
45.                           <xs:element name="EAP-TLS"
                              type="xs:string" />
46.                           <xs:element
                                 name=
                                 "EAP-PEAP_x002F_MSChapV2"
                              type="xs:string" />
47.                       </xs:choice>
48.                   </xs:complexType>
49.               </xs:element>
50.               <xs:element name="Non802.1XURL"
                  type="xs:string" />
51.               <xs:element name="PEAPParameters">
52.                   <xs:complexType>
53.                       <xs:sequence>
54.                           <xs:element
                                 name="Server_x0020_Validation"
                              type="xs:boolean" />
55.                           <xs:element
                                 name="Server_x0020_Names"
                              type="xs:string" />
56.                           <xs:element
                                 name="Server_x0020_Certs"
                              type="xs:string" />
57.                           <xs:element name="CRL"
                              type="xs: string" />
58.                           <xs:element name="EAPType">
59.                               <xs:complexType>
60.                                   <xs:choice>
61.                                       <xs:element
                                             name="EAP-TLS"
                                          type="xs:string" />
62.                                       <xs:element
                                             name="EAP-MSChapV2"
                                          type="xs:string" />
63.                                   </xs:choice>
64.                               </xs:complexType>
65.                           </xs:element>
66.                           <xs:element
                                 name="Fast_x0020_Reconnect"
                              type="xs:boolean" />
67.                           <xs:element
                                 name="MSChapv2Parameters">
68.                               <xs:complexType>
```

-continued

```
69.                        <xs:sequence>
70.                            <xs:element
                                 name=
                                 "Windows_x0020_credentails"
                                 type="xs:boolean" />
71.                        </xs:sequence>
72.                    </xs:complexType>
73.                </xs:element>
74.            </xs:sequence>
75.        </xs:complexType>
76.    </xs:element>
77.    <xs:element name="TLSParameters">
78.        <xs:complexType>
79.            <xs:sequence>
80.                <xs:element
                     name="Smart_x0020_card"
                     type="xs:boolean" />
81.                <xs:element
                     name="Local_0020_Cert"
                     type="xs:boolean" />
82.                <xs:element
                       name="Simple_x0020_selection"
                       type="xs:boolean" />
83.                <xs:element
                     name=
                     "No_x0020_automatic_x0020_selection"
                     type="xs:boolean" />
84.                <xs:element
                     name="Server_x0020_Validation"
                     type="xs:boolean" />
85.                <xs:element
                     name="Server_0020_Names"
                     type="xs:string" />
86.                <xs:element
                     name="Server_x0020_Certs"
                     type="xs:string" />
87.                <xs:element name="CRL"
                     type="xs:string" />
88.            </xs:sequence>
89.        </xs:complexType>
90.    </xs:element>
91.    </xs:sequence>
92.    </xs:complexType>
93. </xs:schema>
```

The example XML configuration schema defines an "SSID" complexType (lines 7-92) that can be used to configure parameters for connecting through a wireless access point to a network represented by the SSID. The SSID complexType further defines a "Connection" element (lines 11-18), an "Authentication" element (lines 19-28), an "Encryption" element (lines 29-39), a "KeyIndex" element (line 40), an "802.1Xauth" element (lines 41-49), a "Non802.1XURL" element (line 50), a "PEAPParameters" element (lines 51-76), and a "TLSParameters" element (lines 77-90).

The defined Connection element (lines 11-18) further defines the types of connections that may be supported by a network. The defined "IBSS" element (line 14) represents the name of a Basic Service Set. An IBSS element can be included in a configuration sub-file to associate a more meaningful network name with an SSID for a network that is potentially accessed through a single wireless access point. The defined "ESS" element (line 15) represents the name of an Extended Service Set. An ESS element can be included in a configuration sub-file to associate a more meaningful network name with a plurality of SSIDs that form a single network and/or when a network is potentially accessed through a plurality of wireless access points.

The defined Authentication element (lines 19-28) further defines the types of authentication that may be supported by a network. The defined "Open" element (line 22) can be included in a configuration sub-file to indicate open authentication. That is, authentication does not use a pre-shared key required to authenticate with an access point The defined "Shared" element (line 23) can be included in a configuration file to indicate that authentication information is shared between applications. The defined "WPA" element (line 24) can be included in a configuration file to indicate that authentication is performed in accordance with WiFi Protected Access. The defined "WPAPSK" element (line 25) can be included in a configuration sub-file to indicate that authentication is performed in accordance with WiFi Protected Access-Pre-Shared Key authentication.

The defined encryption element (lines 29-39) further defines the types of encryption that may be supported by a network. One, some or all of the defined elements at lines 32-36 can be included in a configuration sub-file to indicate different types of encryption, such as, for example, None, WEP encryption, TKIP encryption, Wireless Robust Authenticated Protocol ("WRAP") encryption, and Counter with Cipher Block Chaining Message Authentication Code Protocol ("CCMP") encryption.

The defined KeyIndex element (line 40) can be included in a configuration sub-file to indicate the location of key, such as, for example, a key that can be used for encrypting or validating information.

The defined "802.1Xauth" element (lines 41-49) further defines types of 802.1X authentication that may be supported by a network. One, some, or all of the elements at lines 44-46 can be included in a configuration sub-file to indicate different types of 802.1X authentication, such as, for example, None, TLS, and PEAP.

The defined "Non802.1XURL" element (line 50) can be included in a configuration sub-file to indicate a URL that can be accessed for Non-802.1X authentication. This can be implemented for compatibility with legacy systems that do no not support EAP.

The defined "PEAPParameters" element (lines 51-76) further defines PEAP options that may be supported by a network. One, some, or all of the elements at lines 54-57 and 66 can be included in a configuration sub-file to indicate different PEAP options, such as, for example, server validation, server name lists, server certificate hashes, certificate revocation lists ("CRLs"), and fast reconnect. The defined "PEAPParameters" element (lines 51-76) also further defines an "EAPType" element that can be included in a configuration sub-file to indicate a type of EAP that is used to authenticate a server with a client and/or to authenticate a client with a server. Either or both of the elements at lines 61 and 62 can be included in a configuration sub-file to indicate different EAP types, such as, for example, EAP-TLS and EAP Microsoft Challenge/Replay Handshake Protocol Version ("EAP-MSChapV2"). When EAP-MSChapV2 is indicated, the "MSChapV2 Parameters element at line 67 can be included in a configuration sub-file to indicate whether or not operating system credentials should be used for authentication.

The defined "TLSParameters" element (lines 77-90) further defines EAP-TLS options that may be supported by a network. One, some, or all of the elements at lines 80-87 can be included in a configuration sub-file to indicate different EAP-TLS options, such as, for example, use of a smart card, use of a certificate at the client, use of simple certificate selection, do not use certificate selection, server validation, server name lists, server certificate hashes, and certificate revocation lists ("CRLs").

A signup (or renewal) sub-file can be an XML document defined in accordance with an XML signup schema that is accessible to the computer systems depicted in network architecture 200. In response to receiving an EAP-notification (or TLV object) that more information is needed (e.g., to enable access to resources located on VLAN C), client 205 may automatically download a signup file. The signup file can be processed by user-interface module 206 and a user-interface automatically presented at client 205. Thus, a user need not have prior knowledge of how to cause the user-interface to be presented.

An XML signup schema can define branding information, subscription information (e.g., period, prices, etc.), provider contact information, entry fields for methods of payment (e.g., credit card, paypal, pre-pad cards, certificates, etc.), entry fields for contact information (name, address, telephone number, etc.), credential types, usernames, passwords, RADIUS server certificates, etc. Further, a user-interface can be presented in a variety of different written languages, such as, for example, English, Japanese, French or German. Support for different written languages can be facilitated by use of an XML language tag.

If a user-interface is presented for purposes of renewing a registration, the amount of user-entered information received at the user-interface may be reduced. It may be that a presented user-interface includes only "YES" and "NO" controls for authorizing further credit card payments or other electronic payment options.

Returning to FIG. 3, the method 300 includes a functional, result-oriented step for requesting authorization to access resources located on a second network (step 307). Step 307 may include any corresponding acts for accomplishing the result of requesting authorization to access resources located on the second network. However, in the illustrated example of FIG. 3, the step 307 includes a corresponding act of receiving user-entered information (act 303). A presented user-interface can be used to receive user-entered information (e.g., user-identifier, password, name, address, credit card information, etc.) from a user at client 205. When a user is renewing an account a reduced amount of information may be received. For example, if a user previously signed up to access resources located on VLAN C, account maintenance module 216 may access user database 218 to retrieve previously entered user information thereby relieving a user from having to re-enter the user information. It may be that a user selects a "YES" control to provide user-entered information approving a credit card payment or other electronic payment option.

Step 307 also includes a corresponding act of submitting a schema-based document (act 304). This can include a client submitting a first schema-based document that includes user-entered information to a server. For example, client 205 can submit a first XML document, defined in accordance with an XML signup schema, that includes user-entered information received at a presented user-interface. It may be that client 205 uses an HTTP or HTTPS post to upload schema-based documents to an HSP, an ISP Web site, or to server 215. Account maintenance module 216 can have a Web based interface for receiving schema-based documents uploaded using HTTP and HTTPS posts. In some embodiments, a Web based interface to account maintenance module 216 can process user-entered information included in a schema-based document and update user database 218.

The method 300 also includes an act of receiving an indication of authorization (act 305). This can include a client receiving a second schema-based document that provides an indication that a server authorized the client to access resources located on a VLAN. For example, client 205 can receive a second XML document, defined in accordance with an XML signup schema, that provides an indication client 205 is authorized to access resources located on VLAN C. Reception of a second-schema based document can occur in response to submitting the first schema-based. For example, in response to submitting appropriate user-entered information, client 205 may receive an indication that server 215 has authorized client 205 to access resources located on VLAN C. This can include receiving a user-identifier and password or receiving indication that a credit card payment has been accepted.

When client 205 is authorized to access resources located on VLAN C, access point 209 may enable any protocols that are currently blocked for port 251 and may insert Tag Headers indicating that data from client 205 is to be transferred to VLAN C. Server 215 can send commands to access point 209 to cause access point 209 to enable protocols and cause access point 209 to insert appropriate Tag Headers.

It may be that server 215 sets a session timeout, such as, for example, one hour, after which access point 209 will request client 205 to re-authenticate. If a subscription is still valid at the time of re-authentication, client 205 can re-authenticate in the background by submitting appropriate credentials to server 215. On the other hand, if a subscription period is expired at the time of re-authentication, server 215 may send an EAP-notification (or TLV object) that causes a renewal user-interface to be presented at client 205. A subscription period can expire after a specified period of time (e.g., one month, 24 hours, etc.) or after a specified number of connections (e.g., one connection, ten connections, etc) through a particular service provider. After appropriate completion of the renewal user-interface client 205 can be re-authenticated.

If a user does not appropriately complete the renewal user-interface, access point 209 may cease inserting Tag Headers for VLAN C in data from client 205 and may instead begin inserting Tag Headers for VLAN B into data from client 205. Access point 209 can also begin blocking protocols for port 251. Server 215 can send commands to access point 209 to cause access point 209 to block protocols and to insert appropriate Tag Headers.

In parallel with acts 302 through 305, the method 300 also includes an act of executing a schema-based document (act 306). This can include executing a third schema-based document to configure a client for accessing the second network. For example, provisioning module 208 can execute an XML document, defined in accordance with an XML configuration schema, to appropriately configure client 205 for accessing resources located on VLAN C. Provisioning module 208 can retrieve previously downloaded XML documents, such as, for example, a configuration sub-file, from provisioning data 207.

A configuration sub-file can be executed to configure connection type, communication protocols, authentication type, encryption type, etc. A configuration sub-file can be executed at virtually any time after it is downloaded. Thus, a client can be appropriately configured for accessing resources located on a network even if the client is denied access to the network. Through the execution of a schema-based document, a client can be re-configured with little or no user intervention. This relieves users from having to manually re-configure a client for compatible operation with a network.

In some embodiments, a computer system currently provisioned for Internet access using a first network configuration is pre-provisioned for Internet access using a second network configuration. For example, a computer system with Internet access through an ISP may sign-up at the ISP website for Internet access through a wireless hotspot.

During the registration process with the ISP, the computer system may download provisioning files for the wireless hotspot. Thus, upon connecting to the wireless hotspot, the computer system may already be appropriately configured for accessing the Internet through the wireless hotspot. Further, if account information (e.g., name, address, payment information, etc.) was entered during the registration process with the ISP, the computer system may already be authorized to access the Internet through the wireless hotspot.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system that is network connectable through an intermediary computer system to both a second network that includes a plurality of resources and to a first network that includes at least resources for provisioning the computer system to access the second network, the intermediary computer system determining whether data from the computer system is transferred to the first network or to the second network such that access to the first network can be allowed while access to the second network is restricted, the first network further including a server that can authorize computer systems to access the second network, a method of provisioning the computer system to access the second network so as to reduce user input, the method comprising the following:

an act of sending credentials to the server to attempt to authenticate with the server;

an act of automatically presenting a user-interface that can receive user-entered information so that a user of the computer system is not required to have prior knowledge of how to cause the user-interface to be presented;

an act of receiving user-entered information into the user-interface;

an act of submitting a first schema-based document that includes the user-entered information to the server;

an act of, subsequent to submitting the first schema-based document, receiving a second schema-based document that provides an indication that the server authorized the computer system to access resources located on the second network; and an act of executing a third schema-based document to configure the computer system for accessing the second network so as to relieve a user from having to manually configure the computer system.

2. The method as recited in claim 1, wherein the act of sending credentials to the server comprises an act of sending credentials to an access point that is communicatively coupled to the server.

3. The method as recited in claim 1, wherein the act of sending credentials to the server comprises an act of sending an EAP message to the server.

4. The method as recited in claim 1, wherein the act of sending credentials to the server comprises an act of encapsulating an EAP message within an IEEE 802.1X message.

5. The method as recited in claim 1, wherein the act of sending credentials to the server comprises an act of associating a Tag Header with the credentials so as to indicate that the credentials are to be transferred to a virtual network that includes the server.

6. The method as recited in claim 1, wherein the act of sending credentials to the server comprises an act sending credentials to an Internet Protocol address that was exposed to the computer system by an Internet Protocol address filtering component.

7. The method as recited in claim 1, wherein the act of sending credentials to the server comprises an act of establishing a Virtual Private Network between the computer system and the first network.

8. The method as recited in claim 1, wherein the act of sending credentials to the server comprises an act of sending a User-Identifier.

9. The method as recited in claim 1, wherein the act of sending credentials to the server comprises an act of sending guest credentials.

10. The method as recited in claim 1, wherein the act of automatically presenting a user-interface that can receive user-entered information comprises an act of receiving a notification via EAP that includes a URI to a master provisioning document.

11. The method as recited in claim 1, wherein the act of automatically presenting a user-interface that can receive user-entered information comprises an act of receiving a TLV object via PEAP that includes a URI to a master provisioning document.

12. The method as recited in claim 1, wherein the act of automatically presenting a user-interface that can receive user-entered information comprises an act of receiving an EAP-notification that includes conditions that are to be satisfied to become authorized to access a virtual network that includes the plurality of resources.

13. The method as recited in claim 1, wherein the act of automatically presenting a user-interface that can receive user-entered information comprises an act of accessing a URI to download a master provisioning document.

14. The method as recited in claim 1, wherein the act of automatically presenting a user-interface that can receive user-entered information comprises an act of downloading a file from a virtual network that includes the server.

15. The method as recited in claim 1, wherein the act of automatically presenting a user-interface that can receive user-entered information comprises an act of processing a signup sub-file to cause the user-interface to be presented.

16. The method as recited in claim 1, wherein the act of automatically presenting a user-interface that can receive user-entered information comprises an act of presenting a renewal user-interface that includes user-entered information that was previously entered for a user.

17. The method as recited in claim 1, wherein the act of submitting a first schema-based document that includes user-entered information comprises submitting an XML document that is defined in accordance with an XML signup schema.

18. The method as recited in claim 1, wherein the act of receiving a second schema-based document that provides an indication that the server authorized the computer system to access the second network comprises an act of receiving a second XML document that is defined in accordance with an XML signup schema.

19. The method as recited in claim 1, wherein the act of receiving a second schema-based document that provides an indication that the server authorized the computer system to access resources located on the second network comprises an act of receiving a credentials that can be used to authenticate with the server.

20. The method as recited in claim 1, wherein the act of executing a third schema-based document to configure the computer system for accessing the second network comprises an act of executing an XML document defined in accordance with an XML configuration schema.

21. The method as recited in claim 1, wherein the act of executing a third schema-based document to configure the computer system for accessing the second network comprises an act of executing a schema-based document to configure the computer system to appropriately communicate with a wired network that is accessed through a wireless access point.

22. The method as recited in claim 1, wherein the act of executing a third schema-based document to configure the computer system for accessing the second network comprises an act of executing a schema-based document to configure the computer system to appropriately communicate with a DSL provider.

23. The method as recited in claim 1, wherein the act of executing a third schema-based document to configure the computer system for accessing the second network comprises an act of executing a schema-based document to configure the computer system to appropriately communicate with an ISP.

24. The method as recited in claim 1, wherein the act of executing a third schema-based document to configure the computer system for accessing the second network comprises an act of executing a schema-based document to configure the computer system to appropriately communicate with an Ethernet network.

25. The method as recited in claim 1, further comprising:
an act of, subsequent to sending the credentials, receiving an indication that the server has authorized limited access to the first network for purposes of downloading provisioning files needed to become authorized to access the plurality of resources located on the second network.

26. The method as recited in claim 1, further comprising:
an act of selecting an EAP type that is to be used for authentication.

27. In a computer system that is network connectable through an intermediary computer system to both a second network that includes a plurality of resources and to a first network that at least resources for provisioning the computer system to access the second network, the intermediary computer system determining whether data from the computer system is transferred to the first network or to the second network such that access to the first network can be allowed while access to the second network is restricted, the first network further including a server that can authorize computer systems to access second network, a method of provisioning the computer system to access the second network so as to reduce user input, the method comprising the following:
an act of sending credentials to the server to attempt to authenticate with the server;
an act of automatically presenting a user-interface that can receive user-entered information so that a user of the computer system is not required to have prior knowledge of how to cause the user-interface to be presented;
an step for requesting authorization to access resources located on the second network;
an act of, subsequent to submitting a first schema-based document, receiving a second schema-based document that provides an indication that the server authorized the computer system to access resources located on the second network; and
an act of executing a third schema-based document to configure the computer system for accessing the second network so as relieve a user from having to manually configure the computer system.

28. A computer program product for use in a computer system that is network connectable through an intermediary computer system to both a second network that includes a plurality of resources and to a first network that includes at least resources for provisioning the computer system to access the second network, the intermediary computer system determining whether data from the computer system is transferred to the first network or to the second network such that access the first network can be allowed while access to the second network is restricted, the first network further including a server that can authorize computer systems to access the second network, the computer program product for implementing a method of provisioning the computer system to access the second network so as to reduce user input, the computer program product comprising one or more computer-readable media having stored thereon computer-executable instructions that, when executed by a processor, cause the computer system to perform the following:
send credentials to the server to attempt to authenticate with the server;
present a user-interface that can receive user-entered information so that a user of the computer system is not required to have prior knowledge of how to cause the user-interface to be presented;
receive user-entered information into the user-interface;
submit a first schema-based document that includes the user-entered information to the server;
subsequent to submitting the first schema-based document, receive a second schema-based document that provides an indication that the server authorized the computer system to access resources located on the second network; and
execute a third schema-based document to configure the computer system for accessing the second network so as relieve a user from having to manually configure the computer system.

29. A computer program product as recited in claim 28, wherein computer-executable instructions that, when executed, cause the computer system to send credentials to the server to attempt to authenticate with the server further comprise computer-executable instructions that, when executed, cause the computer system to negotiate the type of authentication that will used by the computer system to authenticate with the server.

30. A computer program product as recited in claim 28, wherein computer-executable instructions that, when executed, cause the computer system to present a user-interface that can receive user-entered information further comprise computer-executable instructions that, when executed, cause computer the system to receive an EAP-notification.

31. A computer program product as recited in claim 28, wherein computer-executable instructions that, when executed, cause the computer system to execute a third schema-based document to configure the computer system for accessing the second network further comprise computer-executable instructions that, when executed, cause the computer system to execute an XML document defined in accordance with an XML configuration schema.

32. In a computer system that is network connectable through an intermediary computer system to both a first virtual network that provides a plurality of services and to a second virtual network that provides at least a subset of the plurality of services such that the intermediary computer system determines whether data from the computer system is transferred to the first virtual network or to the second virtual network, wherein a server connected to the second virtual network can provide update information for updating computer systems to access services on the first virtual network, a method of updating the computer system to access a service on the first virtual network so as to reduce user input, the method comprising the following:
- an act of attempting to access a service on the first virtual network;
- an act of automatically presenting an indication that the computer system is to be updated for compatible access with the service so that a user of the application is not required to have prior knowledge of how to update the computer system;
- an act of receiving user-entered information indicating a desire to update the computer system;
- an act of submitting a first schema-based document that includes the user-entered information to the server;
- an act of, subsequent to submitting the first schema-based document, receiving a second schema-based document that includes update information for the computer system; and
- an act of executing the second schema-based document to update the computer system so as to relieve a user from having to manually update the computer system.

33. The method as recited in claim 32, wherein the act of automatically presenting an indication that the computer system is to be updated for compatible access with the service comprises an act of receiving a notification via EAP that includes a URI to a master provisioning document.

34. The method as recited in claim 32, wherein the act of automatically presenting an indication that the computer system is to be updated for compatible access with the service comprises an act of receiving a TLV object via PEAP that includes a URI to a master provisioning document.

35. The method as recited in claim 32, wherein the act of automatically presenting an indication that the computer system is to be updated for compatible access with the service comprises an act of receiving an EAP-notification that includes conditions that are to be satisfied to become authorized to access the service.

36. The method as recited in claim 32, wherein the act of submitting a first schema-based document that includes the user-entered information to the server comprises an act of submitting an XML document that is defined in accordance with an XML schema.

37. The method as recited in claim 32 wherein act of, subsequent to submitting the first schema-based document, receiving a second schema-based document that includes update information for the computer system comprises an act of receiving a second XML document that is defined in accordance with an XML schema.

38. The method as recited in claim 32, further comprising:
- an act of, subsequent to attempting to access the service, receiving an indication that the server has authorized limited access to the second virtual network for purpose of updating the computer system to access the first virtual network.

39. The method as recited in claim 32, further comprising:
- an act of selecting an EAP type that is to be used for authentication with the first virtual network when attempting to access the service.

40. A computer program product for use in a computer system that is network connectable through an intermediary computer system to both a first virtual network that provides a plurality of services and to a second virtual network that provides at least a subset of the plurality of services such that the intermediary computer system determines whether data from the computer system is transferred to the first virtual network or to the second virtual network, wherein a server connected to the second virtual network can provide update information for updating computer systems to access services on the first virtual network, the computer program product of implementing a method of updating the computer system to access a service on the first virtual network so as to reduce user input, the computer program product comprising one or more computer-readable media having stored thereon computer-executable instructions that, when executed by a processor, cause the computer system to perform the following:
- attempt to access a service on the first virtual network;
- present an indication that the computer system is to be updated for compatible access with the service so that a user of the application is not required to have prior knowledge of how to update the computer system;
- receive user-entered information indicating a desire to update the computer system;
- submit a first schema-based document that includes the user-entered information to the server;
- subsequent to submitting the first schema-based document, receive a second schema-based document that includes update information for the computer system; and
- execute the second schema-based document to update the computer system so as to relieve a user from having to manually update the computer system.

* * * * *